Figure 1:
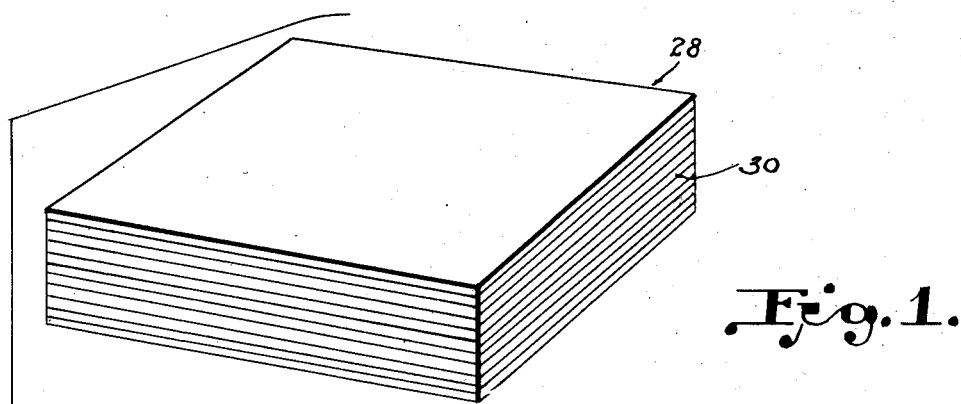

May 19, 1953 G. A. HOFFMANN, JR 2,639,050
PALLETIZING SUPPORT
Filed May 14, 1952

INVENTOR.
George A. Hoffmann, Jr.
BY
ATTORNEY.

Patented May 19, 1953

2,639,050

UNITED STATES PATENT OFFICE 2,639,050

PALLETIZING SUPPORT

George A. Hoffmann, Jr., Richmond, Va.

Application May 14, 1952, Serial No. 287,767

10 Claims. (Cl. 214—310)

This invention relates to a device for palletizing materials and, more particularly, to a device for applying a pallet to or removing a pallet from materials.

In comparatively recent times, the uses of fork trucks and pallets have virtually revolutionized the materials-handling art to the extent that, in many industries, loads are reckoned in units capable of being handled on a pallet, and the units of palleted materials are so handled and warehoused. In order to avoid the expense in unloading and reloading the materials from and back onto the pallets, it is the custom in many industries to ship units of goods on the pallets. Where pallets are shipped with goods, the losses resulting from unrecovered pallets and the storage space and shipping costs are high, and the investment in the pallets in transit is considerable. The primary object is to provide a device which has particular utility for disengaging a pallet from beneath a unit of goods so that the unit may be shipped without the pallet, and for getting the unit of goods back on another pallet at the point of designation so that they may be most conveniently handled or stored.

In accordance with the primary object of the invention, it is intended now to provide a support having upstanding load-engaging members arranged so that when a loaded pallet is lowered down on the support, the upstanding members will engage and support the load in an elevated position while allowing the pallet to drop down from beneath the load, thereby providing a space between the bottom of the load and the top of the pallet so that the forks of a truck may then be engaged beneath the load minus the pallet. In the reverse of the operation, a pallet is placed on the support in position below the tops of the upstanding members, the load is rested atop the upstanding members and then a fork truck or the like lifts the pallet upwardly to engage beneath the load.

While the invention may be used, or modified for use, with pallets of various form, a specific object is to provide a palletizing support in combination with a pallet which is, essentially, a slatted low box-like frame having open opposite ends, and with the slats across the top and bottom so spaced as to form substantial gaps at spaced intervals. It is further intended that the palletizing support include a comparatively low base and a plurality of upstanding posts, the tops of the posts being of greater height above the base than the height of the pallet, and the posts being arranged to pass through the gaps in the pallet. Thus, when a palleted load is lowered down onto the support, the pallet will fit down over the posts, but the load won't, and since the posts have a greater effective height than the pallet, a gap is established between the top of the pallet and the bottom of the load. The forks of a fork truck may then be inserted in the established gap so as to lift the load away independently. Assuming the independent load is to be shipped, dunnage, scrap lumber, or other packing material may be used to maintain passages under the load during shipping so that forks may be re-engaged therebeneath.

Figure 2:
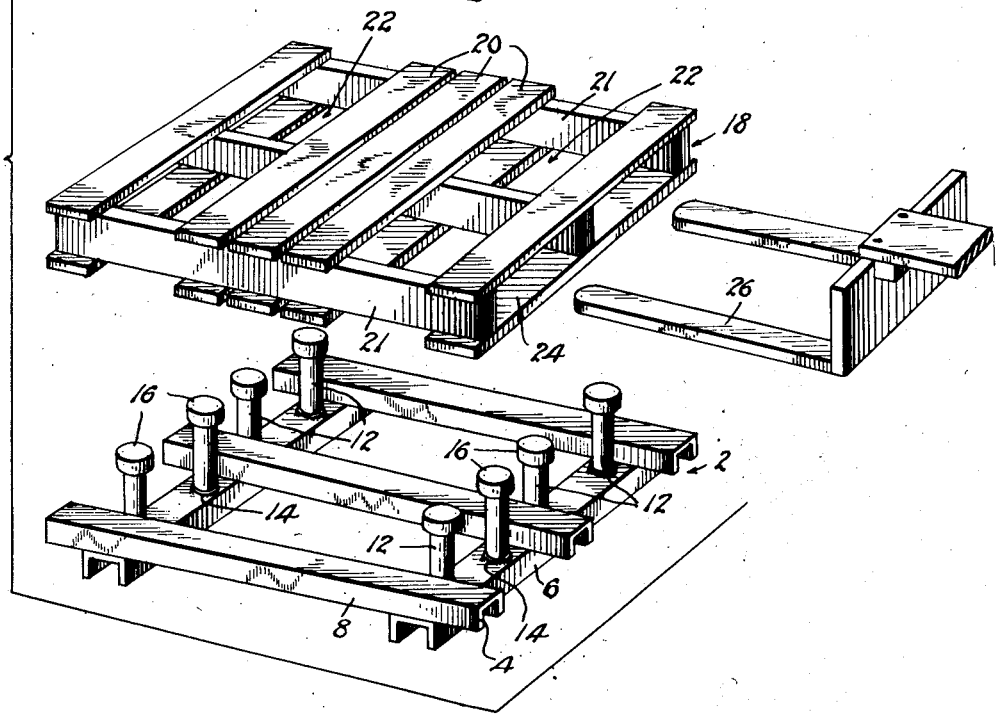
Figure 2:
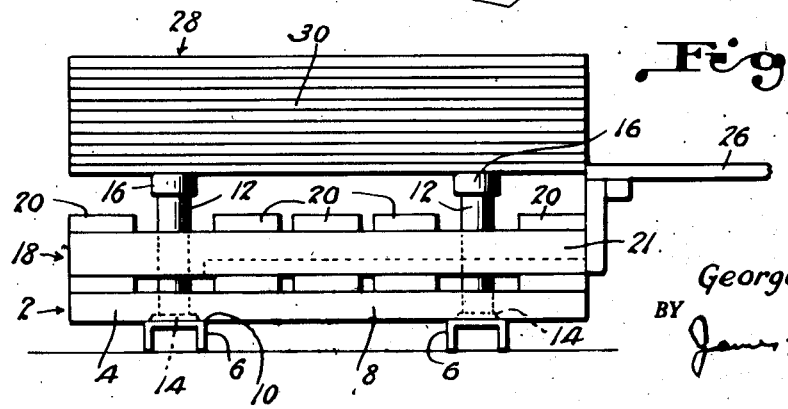

These and other objects will be apparent from the following specification and drawing, in which:

Fig. 1 is an exploded perspective view of the support, a pallet, a typical load, and the forks of a fork truck; and Fig. 2 is a side elevation showing the support in use.

Referring now to the drawing, in which like reference numerals denote similar elements, the palletizing support indicated generally at 2 has a bottom frame 4 of rigid structural members. In the illustrated embodiment, frame 4 is formed of two spaced floor-engaging channels 6 and three spaced cross channels 8, the latter having their lower flanges welded as at 10 to the floor engaging channels.

Spaced along each of the floor channels 6 is a series of upstanding posts 12 having bottom flanges 14 securely fixed, as by welding, to the floor channels 6. Preferably rubber caps 16 are cupped over the top ends of posts 12 to serve as protective buffers. Palletizing support 2 is designed for use in combination with a pallet of the type indicated generally at 18 and formed of spaced slats 20 rigidly affixed to spaced cross boards 21. While pallets of various form may be used, there should be gaps 22 passing vertically through adjacent the ends so that posts 12 may pass through the pallet, as shown at Fig. 2. It is essential that the effective height dimension of posts 12 be sufficient that their upper ends will project above pallet 18 when the latter is engaged in its lowermost position on the palletizing support 2. Finally, pallet 18 should have open ended passages 24 or other equivalent cross-passages to allow insertion of the forks 26 on a conventional fork truck, not shown. The illustrated load 28 to be palletized or depalletized is a stack of wallboard building material 30, it being understood that loads of virtually all types may be handled.

In describing the characteristic uses of the invention, it will be assumed that load 28 is at rest on pallet 18 in a warehouse, and that it is desired to ship the load without the pallet. A fork truck approaches pallet 18, forks 26 are run into open ended passages 24 and pallet 18 with its load 28 thereon are delivered by the fork truck to a position above palletizing support 2. When pallet 18 and load 28 are then lowered, the gaps 22 in pallet 18 allow the pallet to fit down over posts 12 until the pallet comes to rest on frame 4, but meanwhile load 28 has come to rest on rubber caps 16 atop posts 12 well above the top of pallet 18. Forks 26 may then be withdrawn from pallet 18 and re-inserted directly beneath load 28, as indicated in dash line in Fig. 2, whereupon load 28 may be lifted off and delivered minus pallet 18. In practice where a load such as the one illustrated at 28 is to be hauled in a vehicle, supporting spacers of dunnage or the like waste material are usually provided in the vehicle so that forks 26 may be removed or re-inserted. When load 28 is to be palletized, pallet 18 is first fitted down over posts 12 to the position shown in Fig. 2 and load 28 is rested on top of posts 12. Forks 26 are engaged with pallet 18 and the latter is lifted upwardly, first supportingly to engage beneath load 28 and then both the pallet and load together are further lifted until the supporting pallet clears the tops of posts 12, whereafter the palletized load may be conventionally handled.

It will be understood that the invention is not limited to the details of the disclosed embodiment, and that various modifications may be made in the structure detailed above without departing from the spirit of the invention and the following claims.

I claim:

1. In combination, a pallet having a plurality of spaced passages extending vertically therethrough, and a pallet support comprising a base having pallet supporting surfaces thereon and a plurality of spaced upstanding post-like members affixed to and extending upwardly from said base, said post-like members registering with and extending through the passages through said pallet and having their upper ends extending above said pallet when the latter is supported on said base, whereby to support a pallet load spaced above said pallet.

2. In combination, a pallet having a plurality of spaced passages extending vertically therethrough, and a pallet support comprising a relatively low base having upwardly facing pallet supporting surfaces thereon and a plurality of spaced upstanding posts affixed to and extending upwardly from the base, said posts registering with and extending through the passages through said pallet and having their upper ends terminating in a horizontal plane spaced above said pallet when the latter rests on said base, whereby to support a pallet load spaced above said pallet.

3. In combination, a pallet having spaced passage means extending vertically therethrough, and a pallet support comprising a relatively low base having pallet supporting surfaces thereon and a plurality of spaced upstanding posts affixed to and extending upwardly from the base, said posts being in spaced rows registering with and extending through the passage means through said pallet and having their upper ends terminating above said pallet when the latter rests on said base, whereby to support a pallet load spaced above said pallet.

4. In combination, a generally rectangular pallet having a spaced pair of passage rows extending vertically therethrough adjacent opposite sides thereof, and a pallet support comprising a relatively low generally rectangular base having a pallet supporting surface thereon and a plurality of spaced upstanding posts affixed to and extending upwardly from the base, said posts being in spaced rows registering with and extending through the passages through said pallet and having pallet supporting surfaces lying in a horizontal plane spaced above said pallet when the latter rests on said base, whereby to support a pallet load spaced above said pallet.

5. In combination, a generally flat pallet, and a pallet support comprising a relatively low base having upwardly facing pallet supporting surface means thereon and a plurality of spaced upstanding posts affixed to and extending upwardly from the base, said pallet fitting freely over said posts so that the upper ends of the posts extend above said pallet when the latter rests on said pallet supporting surface means, whereby when a loaded pallet is set down from above said pallet support, the load engages and rests on said posts and said pallet descends therebelow to a position of rest on said pallet-supporting surfaces.

6. In combination, a pallet having a plurality of spaced parallel slats defining a pair of spaced parallel gaps extending vertically therethrough, and a pallet support comprising a relatively low base having pallet supporting surface means thereon and a spaced pair of rows of upstanding posts affixed to and extending upwardly from the base, said posts registering with and extending freely through said gaps and having load supporting surfaces thereon spaced above said pallet when the latter rests on said pallet supporting surface means, whereby to support a pallet load above said pallet.

7. A support for palletizing and de-palletizing a load comprising, a relatively low frame comprising a pair of spaced parallel structural members adapted to rest on a floor and a plurality of spaced parallel cross members resting on the floor-engaging members and extending transversely thereto, said cross-members having upwardly facing pallet supporting surfaces thereon, and a plurality of spaced upstanding posts affixed to and extending upwardly from each of said floor-engaging members, said posts being adapted and arranged to pass freely beyond the pallet when the latter is rested on said surfaces and having upper ends terminating in a horizontal plane spaced above said pallet when the latter is so rested, whereby to support a pallet load spaced above said pallet, so that the forks of a fork truck may be freely engaged or disengaged with said pallet or beneath said load.

8. The combination claimed in claim 7 and buffer caps of resilient material engaged over the upper ends of said posts.

9. A support for palletizing and de-palletizing a load comprising, a relatively low frame comprising a pair of spaced parallel structural members adapted to rest on a floor and a plurality of spaced parallel cross members resting on the floor-engaging members, said cross members having upwardly facing pallet supporting surfaces thereon, and a plurality of spaced upstanding posts affixed to and extending upwardly from each of said floor-engaging members, said posts being adapted and arranged to pass freely beyond the pallet when the latter is rested on said surfaces and having upper ends terminating above said pallet when the latter is so rested, whereby to support a pallet load spaced above said pallet, so that the forks of a fork truck may be freely engaged or disengaged with said pallet or beneath said load.

10. A support for palletizing and de-palletizing a load comprising a relatively low frame formed of a first set of spaced parallel structural members of inverted U-shape in cross-section adapted to rest on a floor and a second set of geometrically similar spaced parallel cross members of inverted U shape in cross-section rigidly affixed over the first set in right angular relationship therewith, the webs of said second set of cross-members constituting upwardly facing pallet-supporting surfaces and, a plurality of separate upstanding posts having their lower ends rigidly affixed to one of said sets of members, said posts being arranged in a plurality of spaced parallel rows and being spaced from one another along each row, the upper ends of said posts lying above said pallet-supporting surfaces.

GEORGE A. HOFFMANN, Jr.

References Cited in the file of this patent

UNITED STATES PATENTS

| Number | Name | Date |
|---|---|---|
| 1,271,413 | Allen | July 2, 1918 |
| 1,434,587 | Broadley | Nov. 7, 1922 |
| 2,621,879 | Lundeen | Dec. 16, 1952 |